Dec. 7, 1926.
G. R. LOY
LOCK NUT
Filed Feb. 1, 1924
1,609,563
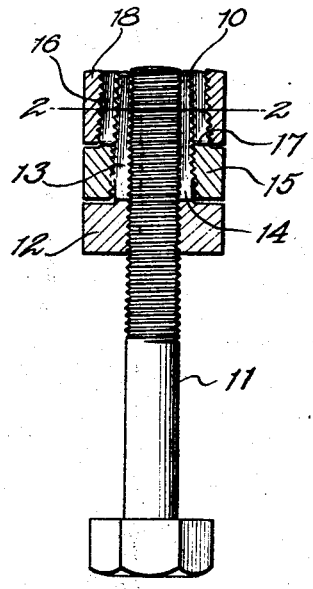
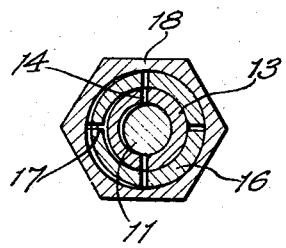
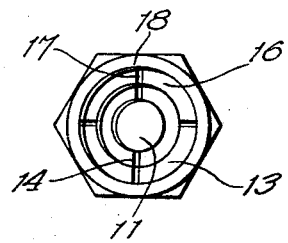
Inventor
George R. Loy
By Victor J. Evans
Attorney
Witness
R. E. Wise Patented Dec. 7, 1926.

1,609,563

UNITED STATES PATENT OFFICE.

GEORGE R. LOY, OF MINNEAPOLIS, MINNESOTA.

LOCK NUT.

Application filed February 1, 1924. Serial No. 690,056.

This invention relates to improvements in lock nuts and has for an object the provision of means whereby a bolt engaging nut may be easily and quickly secured in place so as to prevent accidental removal.

Another object of the invention is the provision of a lock nut which is cheap and simple in construction and reliable and efficient in use.

With the above and other objects in view, the invention further includes the following novel features and details of construction, to be hereinafter more fully described, illustrated in the accompanying drawings and pointed out in the appended claim.

In the drawings:—

Figure 1 is a longitudinal sectional view illustrating the invention.

Figure 2 is a transverse section on the line 2—2 of Figure 1.

Figure 3 is an end view.

Referring to the drawings in detail wherein like characters of reference denote corresponding parts, the reference character 10 indicates a pair of objects or members through which passes a bolt 11, the latter being equipped with a lock nut constructed in accordance with the present invention.

This lock comprises a bolt engaging nut 12 which has projecting therefrom a tapered extension or sleeve 13 which is both internally and externally threaded and provided with longitudinally disposed slits 14. Mounted upon the nut 12 is an intermediate binding nut 15 which also has projecting therefrom a sleeve or extension 16 which, like the sleeve or extension 13 is internally and externally threaded and is longitudinally slitted as shown at 17. The nut 15 serves to force the sleeve or extension 13 into binding engagement with the nut 11 and mounted upon the extension 16 of the nut 15 is a jamb nut 18 which acts to further bind or jamb the sleeve of the nut 15 into engagement with the sleeve of the nut 12 and the latter into engagement with the bolt 11.

By means of the construction just described, the nut 12 may be adjusted to a proper position and the nut 15 adjusted so as to provide a binding engagement between the bolt and the nut 12, while the adjustment of the nut 18 will further act to bind or jamb the nuts 12 and 15 into place and prevent their accidental dislodgement.

The invention is susceptible of various changes in its form, proportions and minor details of construction and the right is herein reserved to make such changes as properly fall within the scope of the appended claim.

Having described the invention what is claimed is:—

A lock nut comprising an inner bolt engaging nut, a tapered externally threaded extension projecting from one face thereof and having longitudinally disposed slits in said extension, an intermediate binding nut threadedly engaging the bolt engaging nut, an externally threaded extension projecting from the binding nut and also provided with longitudinally disposed slots and a jamb nut threadedly engaging the extension of the binding nut.

In testimony whereof I affix my signature.

GEORGE R. LOY.